(12) United States Patent
Apostolopoulos et al.

(10) Patent No.: US 12,251,769 B2
(45) Date of Patent: *Mar. 18, 2025

(54) CLOSED SOCKET BRAZED JOINT ASSEMBLY

(71) Applicant: Transportation IP Holdings, LLC, Norwalk, CT (US)

(72) Inventors: Andreas Athanassios Apostolopoulos, Erie, PA (US); James Wayne, Erie, PA (US); Alan Frampton, Erie, PA (US); Kyle Kessler, Erie, PA (US); Ramesh Edara, Lawrence Park, PA (US)

(73) Assignee: Transportation IP Holdings, LLC

( * ) Notice: Subject to any disclaimer, the term of this patent is extended or adjusted under 35 U.S.C. 154(b) by 259 days.

This patent is subject to a terminal disclaimer.

(21) Appl. No.: 17/866,098

(22) Filed: Jul. 15, 2022

(65) Prior Publication Data

US 2022/0347777 A1    Nov. 3, 2022

Related U.S. Application Data

(63) Continuation-in-part of application No. 16/245,918, filed on Jan. 11, 2019, now Pat. No. 11,420,280.

(51) Int. Cl.
*B23K 1/00* (2006.01)
*F16B 5/08* (2006.01)

(52) U.S. Cl.
CPC .............. *B23K 1/0008* (2013.01); *F16B 5/08* (2013.01)

(58) Field of Classification Search
CPC .... H02K 15/0012; H02K 17/165; H02K 3/04; H02K 3/51; B23K 1/203; B23K 1/008; F16B 5/08
See application file for complete search history.

(56) References Cited

U.S. PATENT DOCUMENTS

| | | | |
|---|---|---|---|
| 4,131,990 A | 1/1979 | Roach | |
| 4,249,098 A | 2/1981 | Karlen et al. | |
| 5,400,951 A | * 3/1995 | Shiroyama | ....... F02M 35/10144 |
| | | | 285/289.5 |
| 11,420,280 B2 | 8/2022 | Apostolopoulos et al. | |
| 2015/0295483 A1 | 10/2015 | Brandl et al. | |
| 2015/0333606 A1 | * 11/2015 | Hanna | .................. H02K 17/165 |
| | | | 29/598 |

FOREIGN PATENT DOCUMENTS

KR    100476587 B1    3/2005

* cited by examiner

*Primary Examiner* — Terrance L Kenerly
(74) *Attorney, Agent, or Firm* — K&L Gates LLP

(57) ABSTRACT

A closed socket brazed joint assembly includes a first member, a second member with a first end having first and second faying surfaces, a socket in the first member that receives the second member with a faying surface with at least two portions separated by a first fillet. Before application of energy to the joint, there is a gap between the faying surfaces of the first and second members. A slug of brazing fill material is between the first end of the second member and at least one faying surface of the socket. Upon application of energy, the brazing fill material melts and flows from between first end of the second member and the at least one faying surface of the socket to fill the gap between the faying surfaces of the first and second members.

20 Claims, 4 Drawing Sheets

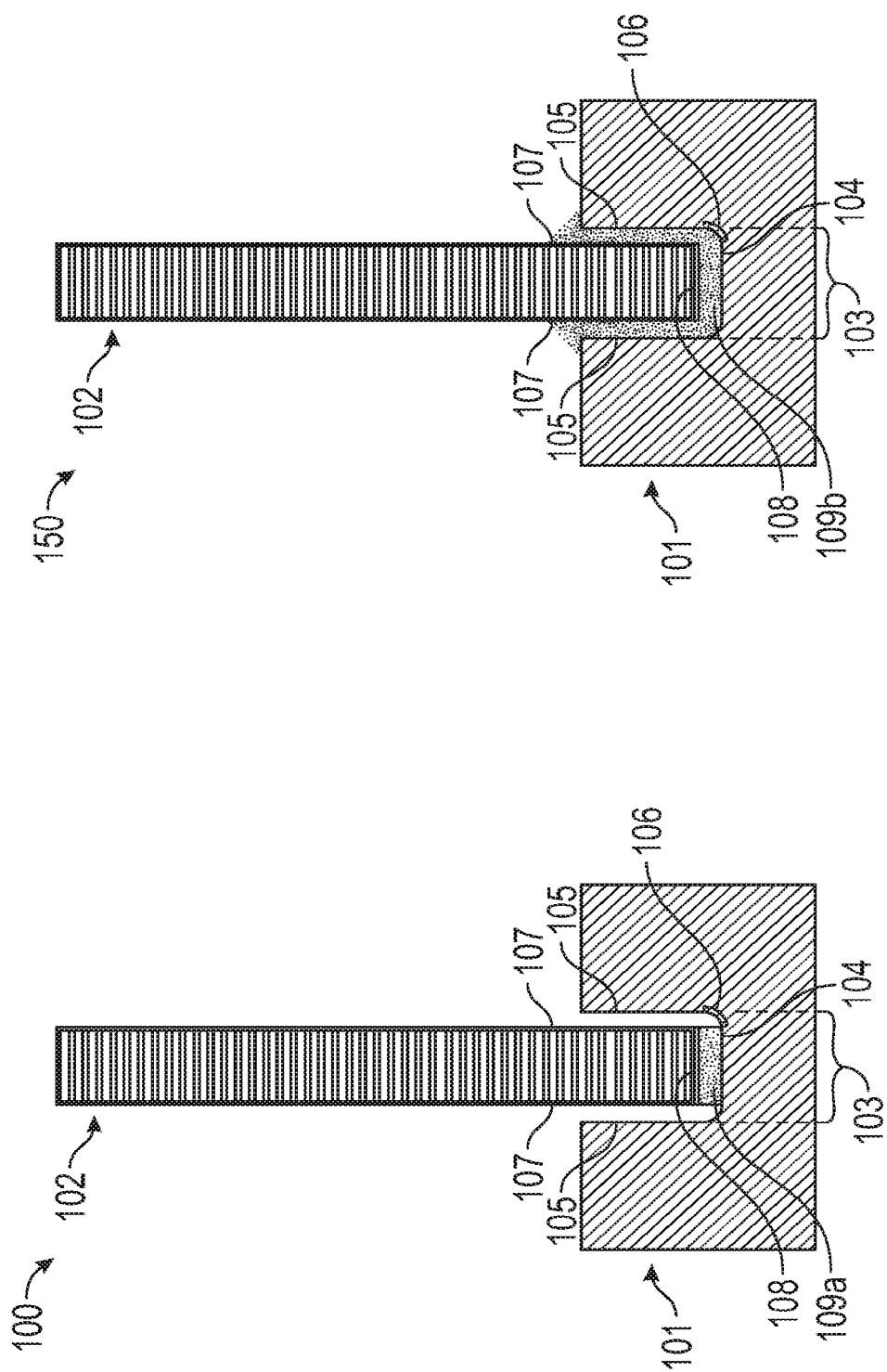

CLOSED SOCKET BRAZED JOINT ASSEMBLY

CROSS-REFERENCE TO RELATED APPLICATIONS

This application is a continuation-in-part of U.S. patent application Ser. No. 16/245,918 (filed 11 Jan. 2019), the entire disclosure of which is incorporated herein by reference.

BACKGROUND

Technical Field

The subject matter described herein relates to closed socket brazed joints. An example of such a joint may be provided from construction of rotor components of an induction motor, which may be referred to as a squirrel cage motor.

Discussion of Art.

Brazing is a technique akin to soldering for joining two pieces of material (e.g., structural members), composed commonly of metals or metal alloys (e.g., base materials). Brazing may be accomplished by heating either the whole or part of the structural members forming a joint to a temperature sufficient to melt a third material (e.g., brazing fill material or BFM) that then either wicks, flows, or utilizes capillary action to fill a gap between overlapping or adjoining surfaces of the two pieces (e.g., faying surfaces), thereby joining the base materials.

The technique differs from welding in that the base materials are not melted or fused together to join the structural members together. Instead, the finished strength of the final joint derives from how well the BFM flows or wicks into the gap between the base materials, evenly contacting the faying surfaces, and solidifies. Common steps in the brazing process can include cleaning the faying surfaces of the structural members that will be joined, placing the faying surfaces of the structural members into the proper alignment and orientation, heating the base materials, applying flux, applying BFM, cooling the joint, and, cleaning the joint.

Common brazing methods can include:

Torch brazing, in which the heat required to melt the BFM is supplied by a fuel gas flame. The fuel gas can be at least one of acetylene, hydrogen, or propane that is combined with oxygen or air to form a flame;

Induction brazing, in which the high frequency oscillation of a nearby electrical current coupled with the subsequent oscillating magnetic field induces heat buildup in the base materials;

Resistance brazing, in which heat is generated from resistance to an electrical current flowing in a circuit that includes the joint;

Furnace brazing, in which the joint is placed in a furnace and heated (with or without atmospheric control); and Dip brazing involves immersion of the entire joint into a bath of molten BFM and/or flux; in both cases the bath temperature is below the melting point of the base materials but above the melting point of the BFM and/or flux.

The presence of dirt and debris coupled with the formation of oxides on the faying surfaces during heating can weaken the strength of the final joint. A material termed flux may be applied to the faying surfaces of the base materials to prevent oxides from forming when the base materials are heated and BFM flows into the joint. Thus, a flux flows into, or is already present in, the joint when heat is applied, and is subsequently displaced by BFM. Flux may also serve the purpose of chemically cleaning any contaminants left on the faying surfaces after an initial cleaning step. Made of numerous materials, flux is available in at least pastes, liquids, semi-solids, putties, or powders. Composite materials may also combine flux with BFM. Flux can also be applied using brazing rods with a coating of flux or a flux core.

In an ideal joint, BFM completely displaces flux from the joint, as flux, and any impurities held by the flux, left in the joint can at least: corrode the joint, impede joint inspection, limit or impede further process steps (such as surface finishing), decrease desired properties in the joint (i.e., electrical conductivity, chemical properties), and weaken overall joint strength. Thus, there is need for brazed joints that increase BFM infiltration and flux exfiltration.

Common brazing joints can include: butt-joints (the faying surfaces are the ends of continuous structural members, such as joining two sheets or rod ends together); lap joints (the faying surfaces are overlapped instead of end-to-end); perpendicular butt joints (the faying surfaces constitute the end of a base material attached to the non-parallel side of another base material, such as the end of a rod to the surface of a sheet); tube-through-plate (wherein the faying surfaces are the sidewall of a tube and the surface of a sheet forming the hole through which the tube passes); and socket-joints (wherein the faying surfaces are formed from the end of one piece of a structural member inserted into a complementary socket). These basic joint types can be combined to form more complex joints; for example, a tube-through-plate that incorporates lap joints to increase the faying surface area. Overlap of faying surfaces, particularly for lap and angled butt joints, is typically designed to fall in the range of 3-to-4 T (6 T max), where "T" is the thickness of the thinner base material. Socket joint design requires the consideration of additional factors.

Socket joints may be either closed or open. A typical socket joint of either type may be formed by: fluxing the faying surfaces, inserting one end of a structural member made of a first base material into a socket formed in a structural member composed of a second base material, placing a ring of BFM wire around the joint opening, heating the faying surfaces which melts the ring of BFM wire, allowing the BFM to flow into the joint, cooling the joint, and cleaning the joint. In an alternative process, an end of BFM wire may be placed at the opening of a heated joint, the end is then moved around the opening perimeter allowing BFM to wick into and complete the joint. Whether performed by automation or by hand, both techniques display high variance in the overall quality of the finished joint. For example, BFM may not fully fill the joint, and flux or other materials may remain trapped within the joint. Amongst many factors (e.g., skill of the practitioner, joint geometry, joint materials, etc.), the displayed variance can also be attributed to poor movement of trapped gasses and flux material from the joint interior.

In addition to flux displacement as BFM flows into the joint from the socket opening, socket joints must also account for the venting of heated gases formed in the joint when the base materials are heated (i.e.: when base materials off-gas from heating, the secondary heating of gases in the joint space due to the heated base materials), flux material is vaporized or liquified, or there is off-gassing from the BFM. In an open socket design a drain hole is located in the socket to facilitate the exfiltration of flux and gases during BFM infiltration. In addition to adding complexity to the manufacture of the joint, the addition of a hole to create an open socket is not always possible.

In similar fashion for a closed socket, the creation of a flux well (an indentation, concavity, or other space designed to allow displaced flux to gather when displaced by BFM) increases manufacturing complexity. Such a formation is further disadvantaged by decreasing the available faying surface area and increasing the likelihood of corrosion formation in the joint due to trapped impurities in the captured flux or just the flux itself. Thus, there is need for a socket that: increases faying surface area, reduces manufacturing complexity, increases gas venting, and increases flux exfiltration.

Since brazed joints may rely on capillary flow of BFM into the joint, tolerances can be calculated to maintain a clearance between faying surfaces that allows for the most effective capillary action. If the clearance is too narrow, BFM cannot flow into the joint in a fashion that allows for optimal distribution and an even coating across the faying surfaces, weakening the joint. In the alternative, if the tolerances are too wide the strength of the joint will be reduced almost to that of the BFM. Also, the larger gap reduces capillary action resulting in BFM failing to fully penetrate the joint, further weakening the joint. Since brazing often occurs at elevated temperatures, joint design can account for various coefficients of thermal expansion for the base materials so that ideal tolerances are maintained at brazing process temperatures. When heating complex assemblies with multiple structural members and multiple brazed joints, either in uniform or in sectional application, heat and/or vibrational induced movement in the assembly may move associated structural members ready to be brazed and their faying surfaces out of tolerance prior to final joint formation. Thus, there is need for a brazed joint that may maintain the clearance tolerances of constituent pieces prior to the formation of a completed joint.

Many induction motor rotors, and particularly those adapted for use in large machines, may feature a squirrel cage winding. In a squirrel cage winding, preformed conductor bars span across the rotor core with conductive annular end rings interconnected, both in electrical and mechanical fashion, to extensions of the bars at opposite ends of the core. The result is the winding structure from which the descriptive name squirrel cage is derived. In this example the conductor bars and annular rings are structural members composed of base materials with multiple joints forming a complex assembly.

Four types of joint demonstrate some common means of accomplishing the interconnection of the conductor bars to the conductive annular rings: a butt joint between the end face of a conductor bar and the adjoining flat face of an annular ring; a lap joint wherein a conductor bar is seated into a circumferentially placed, radially extending slot cut into the annular ring; a lap joint wherein a long axis surface of the conductor bar is positioned atop a proportionally sized surface of the annular ring; finally, a butt joint formed by inserting the end face of a conductor bar into a circular groove inscribed into a face of an annular ring. Practitioners in the art can appreciate that none of the techniques listed above secure all faces of the faying surface of a conductor bar end to the annular ring; at most, for a bar with a rectangular profile, three faces are in contact with the annular ring resulting in a weaker joint than if all faces, and hence all of the available faying surface, was connected. In the case of the annular-groove joint, BFM may not fully wick into and fill the gap between the groove wall and the conductor bar face despite proper tolerances. Further, the efficient transfer of electrical energy relies on reducing the amount of material at the interface of the faying surfaces while increasing the overall surface area of the connection. Thus, there is need for a joint that increases conductive transfer and mechanical strength while reducing the usage of connective material.

BRIEF DESCRIPTION

In an embodiment, a closed socket brazed joint assembly is provided. The assembly includes: a first member composed of a first base material; a second member composed of a second base material with a first end composed of a first profile with at least first and second faying surfaces; a socket formed in said first member configured to receive the first end of the second member with a faying surface with at least two portions separated by a first fillet; wherein the socket further is configured such that in a first state before the application of energy to the joint there is a gap with a width between the faying surfaces of the first member and the faying surfaces of the second member; and, in the first state a slug of brazing fill material is disposed between the first end of the second member and at least one faying surface of the socket; and, wherein a second state is created when upon application of energy the brazing fill material melts and flows from between first end of the second member and the at least one faying surface of the socket filling aforesaid gap between the faying surfaces of the first and second members.

In another embodiment, a brazed joint assembly is provided. The assembly includes: at least one closed socket brazed joint with at least first and second members with respective faying surfaces; at least one indexed closed socket brazed joint with at least first and second members and at least one index guide; wherein the at least one index guide of the at least one indexed closed socket brazing joint is configured to align the faying surfaces of the at least first and second members of the at least one closed socket brazed joint.

In another embodiment, there is provided a method for the assembly of a closed socket brazed joint. The method comprises: providing a first member composed of a first base material; providing a second member composed of a second base material with a first end composed of a first profile with at least first and second faying surfaces; forming in a first member at least one socket configured to receive the first end of the second member with a faying surface with at least two portions separated by a fillet the radius of which is at least equal to the distance between the faying surfaces of the first and second members; providing a slug of brazing fill material substantially in conformation with the first profile of the first end of the second member; placing the slug of brazing fill material in the socket formed in the first member; placing the first end of the second member into the socket of the first member, trapping the slug of brazing fill material; applying energy to the base materials of at least one of the first and second members; and, melting the brazing fill material.

In another embodiment, there is provided an apparatus comprising a first member having a first surface. The first member defines a closed socket formed into the first surface, the socket defined by plural faying surfaces, the plural faying surfaces including a peripheral sidewall and a floor. The peripheral sidewall extends from the first surface of the first member and terminates at the floor, the floor and the first surface not intersectional with each other. The peripheral sidewall is transitioned to the floor by a fillet. The socket is dimensioned to receive an end of a second member, the second member having plural faying surfaces for joining the second member to the first member.

BRIEF DESCRIPTION OF THE DRAWINGS

The subject matter may be understood from reading the following description of non-limiting embodiments, with reference to the attached drawings, wherein below:

FIGS. 1A and 1B illustrate cross sectional schematic views of examples of closed socket brazed joint assemblies before application of heat (FIG. 1A) and after application of heat (FIG. 1B);

DETAILED DESCRIPTION

Figure 2A:
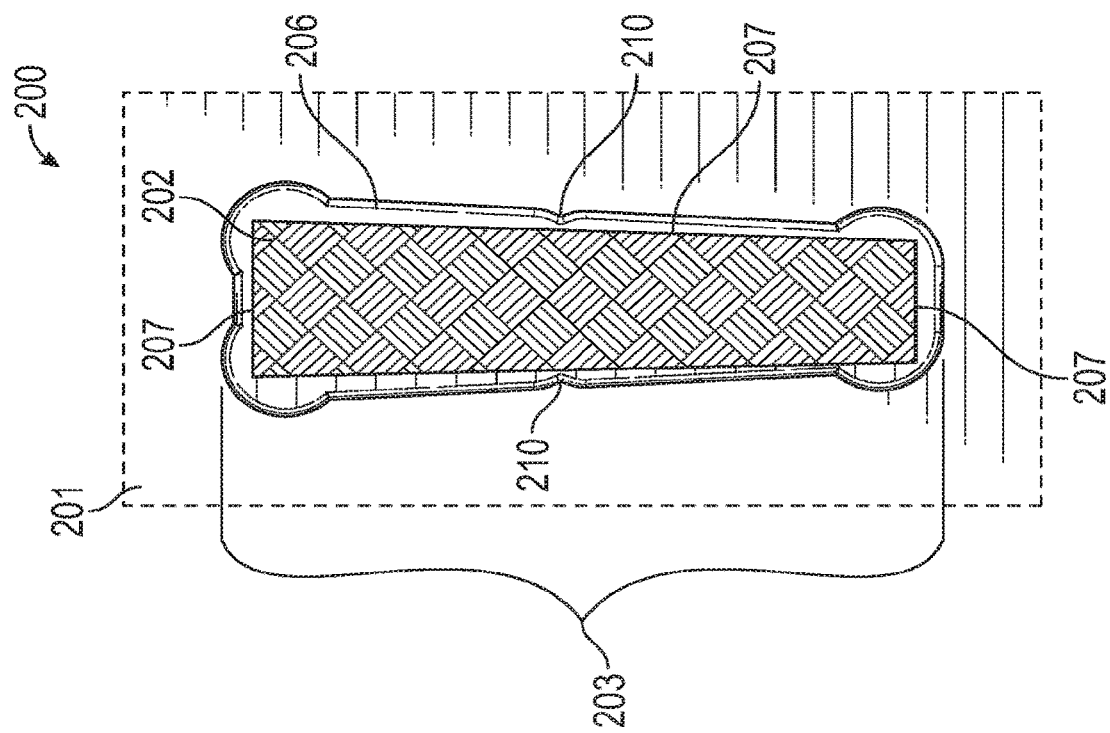
FIG. 2A is a perspective view of an example of a first structural member with a socket for formation of an indexed closed socket brazed joint assembly.

While one or more embodiments are described with respect to construction of an indexed closed socket brazed joint for joining conductor bars to an annular ring as part of an inductive motor rotor assembly, not all embodiments are limited to forming parts of an inductive motor rotor assembly. One or more embodiments may be used to form other types of brazed assemblies having closed socket type joints, such as closed socket joints that are soldered or welded). One or more embodiments may be used for joining procedures requiring flow of a fill material, at any temperature, using mechanical or capillary methods to flow the fill material into a close-ended socket joint.

FIGS. 1A and 1B present two cross-sectional schematic views of a closed socket brazed joint assembly before 100 application of heat (FIG. 1A) and after 150 application of heat (FIG. 1B). As shown in FIGS. 1A and 1B, the joint assembly includes a first member 101 and a second member 102. These members may be formed from the same or different base materials. These members may be structural members, such as parts or pieces joined to other part(s) or piece(s). The members may be formed from one or more base materials with the same or varying coefficients of thermal expansion and the same or different mechanical and chemical properties. The base materials may be base metals or other materials. The base materials may include the composition of the structural members interconnected by the brazed joint. The base materials may be of the same or different composition from each other with the same or varying coefficients of thermal expansion. In practice, the base materials may have a melting temperature that is different from the BFM.

A socket 103 may be formed in the first member. This socket includes a floor 104 and side walls 105 that include portions of overall faying surface that is available in the socket. The socket may include or be a space with faying surfaces formed in the base material of a structural member or members of a joint assembly. The socket can be formed by the joining together of two or more structural members to accept positioning of an additional member into the joint assembly. Optionally, the socket may be formed in the base material of a single structural member to accommodate the faying surfaces of one or more structural members forming the joint. An open socket may include a hole or recess that allows for venting of flux and gases during formation of a brazed joint. In contrast, a closed socket does not have such a hole or recess.

The floors, walls, and/or side walls described herein may include the faying surfaces within a socket and may not require a specific orientation of a final joint or assembly of joints. The socket may have one overall faying surface, the portions of which are subdivided and named as described herein. Likewise, the end of a structural member with a profile complementary to the socket may include a single faying surface subdivided into identifiable portions. As shown in FIGS. 1A and 1B, the floor may interconnect the side walls by extending from one side wall to another side wall. The floor may be referred to as an interconnecting wall or surface, a horizontal wall or surface, etc. The side walls may be referred to as vertical walls or surfaces, opposing walls or surfaces, or the like.

One or more fillets 106 form connections or interfaces between the floor and the side walls of the first member. These fillets may be curved in that the fillets are not formed by a single planar surface or two planar surface. In one embodiment, the fillets may be a curved surface or arc that extends from one side wall to the floor (or from the floor to the side wall). Each of the fillets may represent a portion of a circumference of a circle. The curvature of the fillet may be represented by a radius of curvature, which can be measured as the radius of the circle of which the arc forms a portion of the circle circumference. This radius may be measured from the center of the circle (of which the arc forms a portion of the circle circumference). As another example, the fillet may be a concave junction formed where two surfaces (e.g., the side wall and the floor) meet and/or a strip of material that gives a rounded appearance to the concave junction. In one embodiment, a fillet excludes an intersection between planar surfaces that is not curved. For example, a fillet may exclude a polygon shaped corner between intersecting surfaces.

The fillet optionally can include one or more planar or flat surfaces. For example, the fillet may be formed as a chamfer or a series of interconnected planar or flat surfaces. The second member may include faying surfaces 107 that are substantially in conformation with the side walls and faying surface 108 which is substantially in conformation with floor 104. The faying surfaces 107 may be referred to as lateral faying surfaces (as the surfaces are on the opposite lateral sides of the second member), opposite faying surfaces (as the surfaces are on opposite sides of the second member), side wall faying surfaces (as the surfaces face the side walls of the socket in the first member), vertical faying surfaces, or the like. The faying surface 108 can be referred to as an interconnecting faying surface (as the faying surface 108 interconnects or extends from one side wall faying surface to another side wall faying surface), a horizontal faying surface, or the like. As shown in FIGS. 1A and 1B, the side walls of the second member may face or oppose the lateral faying surfaces of the first member, and the floor of the second member may face or oppose the horizontal faying surface of the second member. The side walls of the second member may be parallel to the lateral faying surfaces of the first member and/or the floor of the second member may be parallel to the horizontal faying surface of the second member. Alternatively, one or both of the side walls of the second member may be angled (e.g., not parallel) to the lateral faying surfaces of the first member and/or the floor of the second member may be angled to the horizontal faying surface of the second member.

A slug 109a of BFM may be placed between the horizontal faying surface of the second member and the floor of the first member. The slug may be fluid, semi-fluid (e.g., pliable), or flexible (e.g., more flexible than the faying surfaces, wall, or side walls) such that the shape of the slug conforms to the space or gap between the first and second members in the location where the slug is placed. After application of energy (e.g., thermal energy, such as heat), the slug may melt and flow, or otherwise change shape, to completely or partially fill the joint by coating the faying surfaces 104, 105, 107, 108 and completing the interconnection of first member and the second member. The energy may be applied to directing the energy (e.g., thermal energy) into the socket and/or toward the slug of BFM. Directing the energy can include purposefully or intentionally causing the energy to be oriented or focused toward the slug or socket, as opposed to general increases in ambient temperature.

In the illustrated embodiment, the clearance or separation distance between the lateral faying surfaces of the second member and the side walls of the first member may be targeted to be 0.015 inches with a range of 0.006-0.020 inches. Each of the fillets may have a target radius of 0.015 inches and a range of 0.010-0.020 inches. These clearances may be adapted to particular geometries for the socket and the lateral faying surfaces, including accounting for coefficients of thermal expansion for the base materials of the first member and the second member.

To minimize or reduce any gases that remain trapped (e.g., that may remain between the first member and the second member in the socket after the application of thermal energy, the slug can be equal in size or slightly larger in size to the horizontal faying surface of the second member that faces the floor of the socket in the first member. For example, the width of the slug (measured in a direction that is parallel to the horizontal faying surface of the second member) may be wider than the width of the horizontal faying surface of the second member (measured in the same direction or in a parallel direction). The volume of the slug (V109a) may be the volume of the socket (V103) minus the volume of the portion of second member (V102) that is in the socket, multiplied by a factor (e.g., two or another value). For example, the volume of the slug can be twice the difference between the volume of the socket and the volume of the portion of the second member that is in the socket of the first member. Stated differently, the slug volume can be twice the size of the space or gap between the first and second members within the gap. Thus, V109a=(V103−V102)×2 with the target value for V109a set at 2 and a range of 1.8 to 2.2 units of volume. The units may be scaled appropriately to the process and parts in a particular application. Once a volume is determined, a mass for the slug may be calculated and used. This can result in the slug being larger than the remaining space in the socket between the first member and the second member, and can result in the slug extending out of the socket prior to application of heat. Conversely, the slug may be smaller. For example, the volume of the slug may be less than the difference between the socket volume and the volume of the portion of the second member that is in the socket. This type of slug may have a volume that is no greater than this volume difference (e.g., the difference between the socket volume and the volume of the portion of the second member in the socket), or that is no larger than some factor of this volume difference. For example, the slug volume may be no larger than half of this volume difference, one quarter of this volume difference, or the like.

Flux material may be applied directly to the faying surfaces 104, 105, 107 before initial joint assembly. In the alternative, flux material may be present as part of the slug or may be formed into separate single or multiple slugs placed between the horizontal faying surface of the second member and the slug, and/or between the slug and the faying surface or floor 104.

When energy (e.g., heat) is applied, the slug may melt and move up (via capillary action) from between the opposing faying surfaces 104, 108 up into the gap between the faying surfaces 105 and 107. The slug can fill the joint with the BFM material (as shown in FIG. 1B) and complete the assembly 150. The fillet may facilitate escape of the flux and the trapped gases, and enhance the capillary movement of the slug material to permit filling of the joint and contact with all faying surfaces.

The indexed closed socket brazed joint assembly may be formed by the following method or process. At a first step, forming a socket in a first member composed of a first base material. The socket is formed with faying surfaces in negative profile with faying surfaces of a second member composed of a second base material. For example, the socket may be formed to have a shape that is complementary to the shape of the second member or to have a shape that can receive the second member. The interface between the floor and the side walls of the socket may be formed by a fillet cut or fillets having a radius equal to or longer than the clearance gap between the side wall faying surfaces and the faying surfaces of the second member. At another step, a slug of BFM may be placed in the socket substantially in conformation with the profile of the horizontal faying surface of the second member with a volume within the range of 1.8 to 2.2 of the volume of the socket, minus the volume of the second member in the socket. At another step, the second member may be inserted into the socket formed in the first member. At another step, energy is applied, thereby resulting in heat to the structural members. This energy may melt, in whole or part, the slug. The energy may be applied for some or all of the time required for the slug to fill the joint (e.g., the spaces between the first and second members). At another step, the energy and/or source of energy can be removed and the finalized joint assembly can be allowed to cool or may be actively cooled (by blowing air over the assembly or placing the assembly in a cool location). In an alternative form, the slug may first be attached to the end of the second member (via flux, paste, or the like) prior to insertion of the second member into the socket of the first member and prior to joint completion.

Figure 2B:
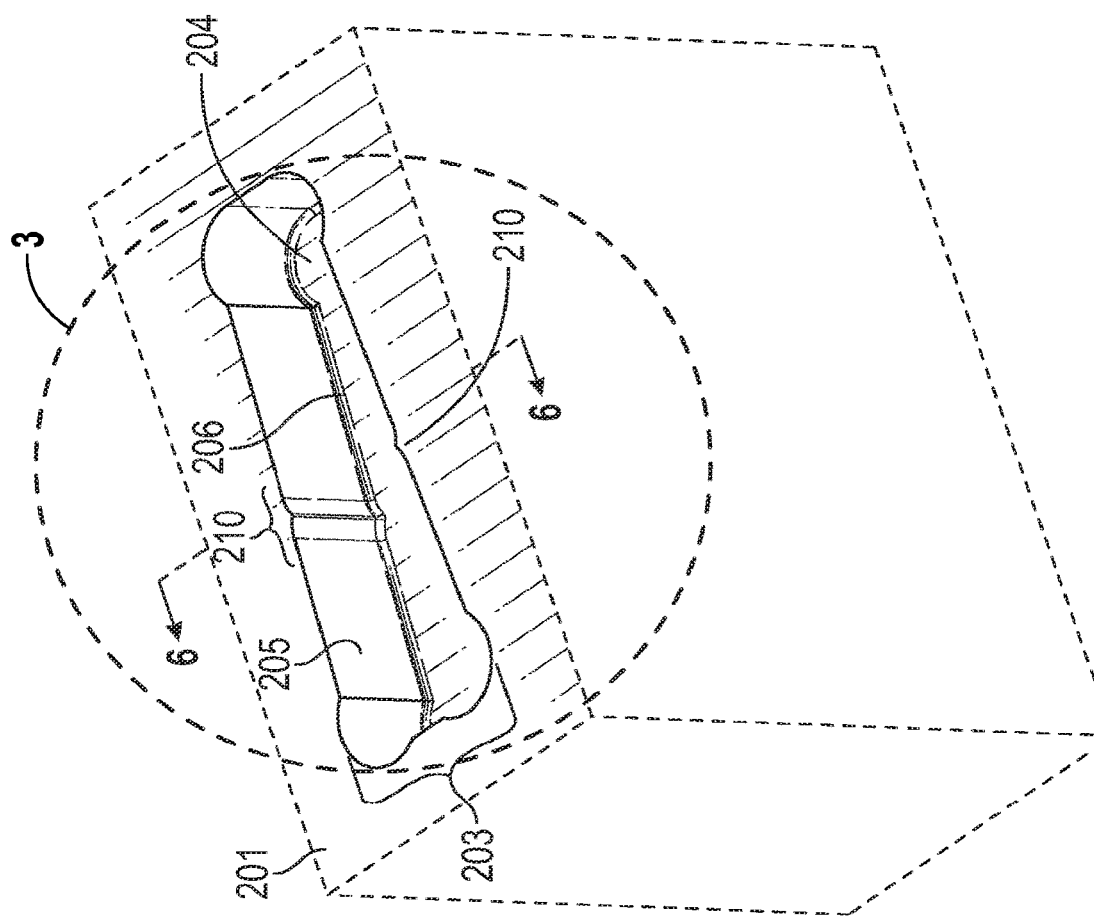
FIG. 2B is a top plan view of the indexed closed socket brazed joint assembly before application of heat according to one example.

FIG. 2A shows a perspective view of a structural member with a socket 203 for the formation of an indexed closed socket brazed joint assembly according to another example. FIG. 2B shows an overhead or top plan view of an indexed closed socket brazed joint assembly 200 before application of energy. Visible in both FIGS. 2A and 2B are: a first member 201 with a socket 203, one or more fillets 206 joining faying surface walls 205 to a floor faying surface 204, and indexing guides 210. FIG. 2B further illustrates a second member 202 with wall faying surfaces 207 positioned in the socket.

The slug of brazing fill material may be disposed between the floor of the socket shown in FIGS. 2A and 2B and a surface of the second member that faces the floor prior to directing thermal energy into the socket. Upon application or direction of thermal energy into the socket, the slug may melt and flow to fill or substantially fill the gap(s) between the second member and the floor of the first member and/or the gap(s) between the second member and the side walls of the socket.

The indexing guides align the faying surfaces of the second member with the floor faying surfaces and the faying surface walls of the socket. The indexing guides can include configurations of the socket wall(s) that align and/or orient the faying surfaces of the first member and the second member. An indexing guide may be formed from the same base material as the first member, or may be formed from one or more additional materials. For example, the indexing guide may be formed by a piece of flux material that then vaporizes upon completion of joint formation. The indexing guide may also be integral with the faying surface of the first member. An indexing guide may have a simple shape with a first surface, a contact surface, and a second surface. The guide may also be integrated into the first faying surface. An indexing guide may also be formed as part of other structural features. For example, the transitional ends of a fillet may be further refined to serve as guides either by virtue of placement or by further modification into a more complex shape.

In this instance, the indexing guides are peaks or protrusions having a target clearance of 0.002 inches (in) from the faying surfaces of the second member (that face the interior walls of the socket in the first member). The indexing guides may protrude outward from the interior walls of the socket in the first member toward the second member in the socket. The indexing guides may protrude toward each other, as shown in FIGS. 2A and 2B, or may be located in different locations where the guides protrude into the socket, but not toward each other (e.g., where the guides are not in locations that directly oppose each other across the socket). The indexing guides may contact the second member to locate (e.g., center) the second member along the longitudinal axis of the joint formed by the first and second members. The indexing guides may protrude sufficiently far to prevent the second member from being located too far to one side or another of the socket, as shown in FIGS. 2A and 2B. The indexing guides may have little to minimal impact on the overall available faying surfaces available in the joint. While two indexing guides are shown, for some geometries only one guide may be used or more than two guides may be used. Tolerances, geometry, and final sizing of the indexing guides may also be adjusted to account for various coefficients of thermal expansion and final joint strength requirements. In some instances, the indexing guides may be formed to increase the available faying surface area. For example, the indexing guides may increase the available surface area that can be used as a faying surface (relative to not having the indexing guides). Examples of other indexing guides include a tongue-and-groove alignment, indexed tabs, etc.

In an assembly utilizing multiple closed socket brazed joints, one or more sockets may contain the indexing guides. For example, in the construction of the squirrel cage rotor assembly, multiple conductor bars may be interconnected with the conductive annular rings using multiple joints. The socket 203 with indexing guides 210 may be formed in three separate locations on the annular ring of the assembly spaced 120° apart. Subsequent sockets 103 that do not include indexing guides may then be spaced in accordance with the number of conductor bars required for the assembly. The multiple joints are indexed by the three sockets having indexing guides and may be brazed either individually or sequentially, all at once, or in multiple groups (e.g., in a batch manner).

Figure 3:
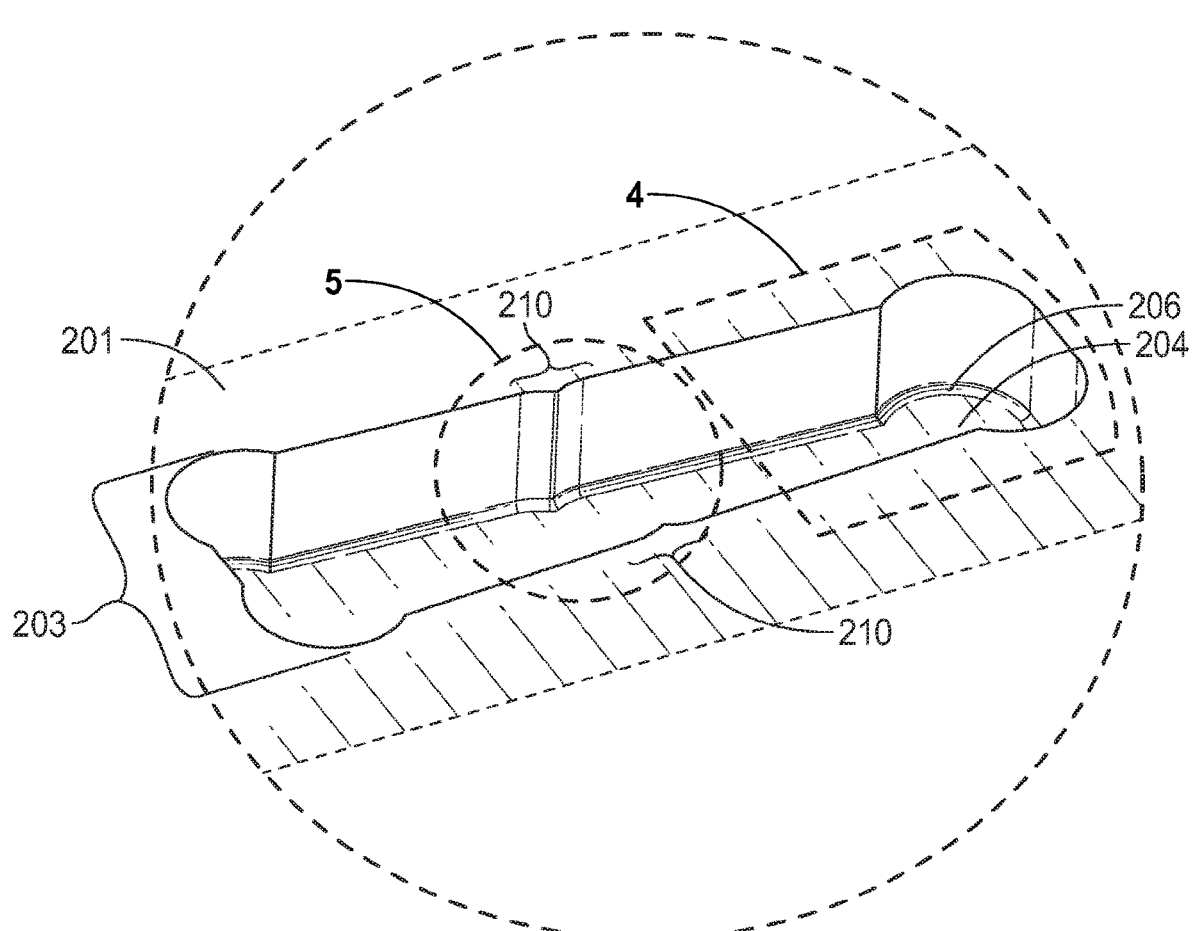
FIG. 3 is another perspective view of the first structural member shown in FIG. 2A and as set off by the dashed circle in FIG. 2A.

FIG. 3 illustrates a detail second perspective view of a first member formed with a socket for the formation of an indexed closed socket brazed joint assembly according to an embodiment of the present invention as set off by the dashed circle in FIG. 2A. The view is otherwise identical to that of FIG. 2A with all features present and serves to highlight the locations of detail views illustrated in FIGS. 4 and 5.

Figure 4:
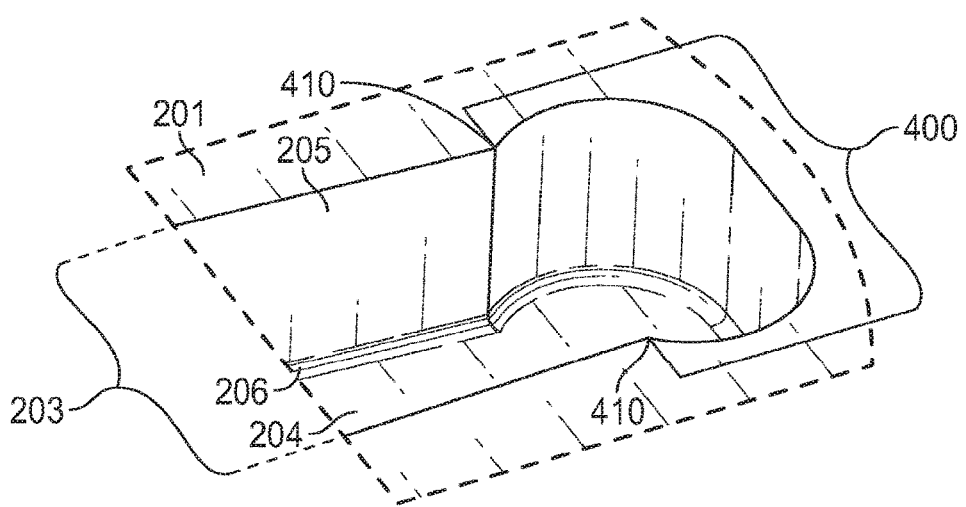
FIG. 4 illustrates an end of the socket shown in FIG. 3 according to one example and as set off by the dashed box in FIG. 3 thereof.

FIG. 4 shows a detail view of one end of the socket of FIG. 3 and FIG. 2A according to one embodiment as set off by the dashed box in FIG. 3. Visible are: the surface of the first member 201, the floor faying surface 204, the wall faying surface 205, and the fillet 206. As illustrated in FIG. 2B, the socket and the second member may have a tapered shape such that each of the socket and the second member are more narrow at one end of the respective socket and second member, and wider at the opposite end of the socket and second member. The tapered end of the second member (e.g., the narrower end) has the faying surface along the end of the second member. This end faying surface interfaces with (e.g., faces) the faying surfaces of a filleted end 400 of the socket. The filleted end of the socket may be the narrower end of the socket. As shown, the faying surfaces or walls of this filleted end may be curved with a constant radius of curvature or two or more different curves with the same or different radii of curvature. The radius of curvature of the filleted end of the socket may be defined by the curvature or circumference of the arc extending from one endpoint 410 to another endpoint 410. The radius of the curves of the filleted end may be defined or sized such that the gap between the faying surfaces 205 and 207 are in the range of 0.006-0.020 in with a target clearance of 0.015 in. The filleted end of the socket may cooperate or work with the fillet along the interface between the floor and side walls of the socket to provide additional space for gas and flux exfiltration during heat application and joint formation. For example, the spacing or gap between the second member and the first member in the filleted end of the socket and/or the curved fillet in the socket may be larger relative to sockets not having the curves in the end and/or not having the curved fillet. This larger spacing or gap can allow for gas and/or flux to flow or otherwise exit from between first and second members. The endpoints may be shaped or altered such that the endpoints serve the function of indexing guides, with similar tolerances with the interface of faying surface, thereby simplifying the machining required. For example, the corners formed by the endpoints of the curved filleted end of the socket may engage the second member to locate the second member in the socket.

Figure 5:
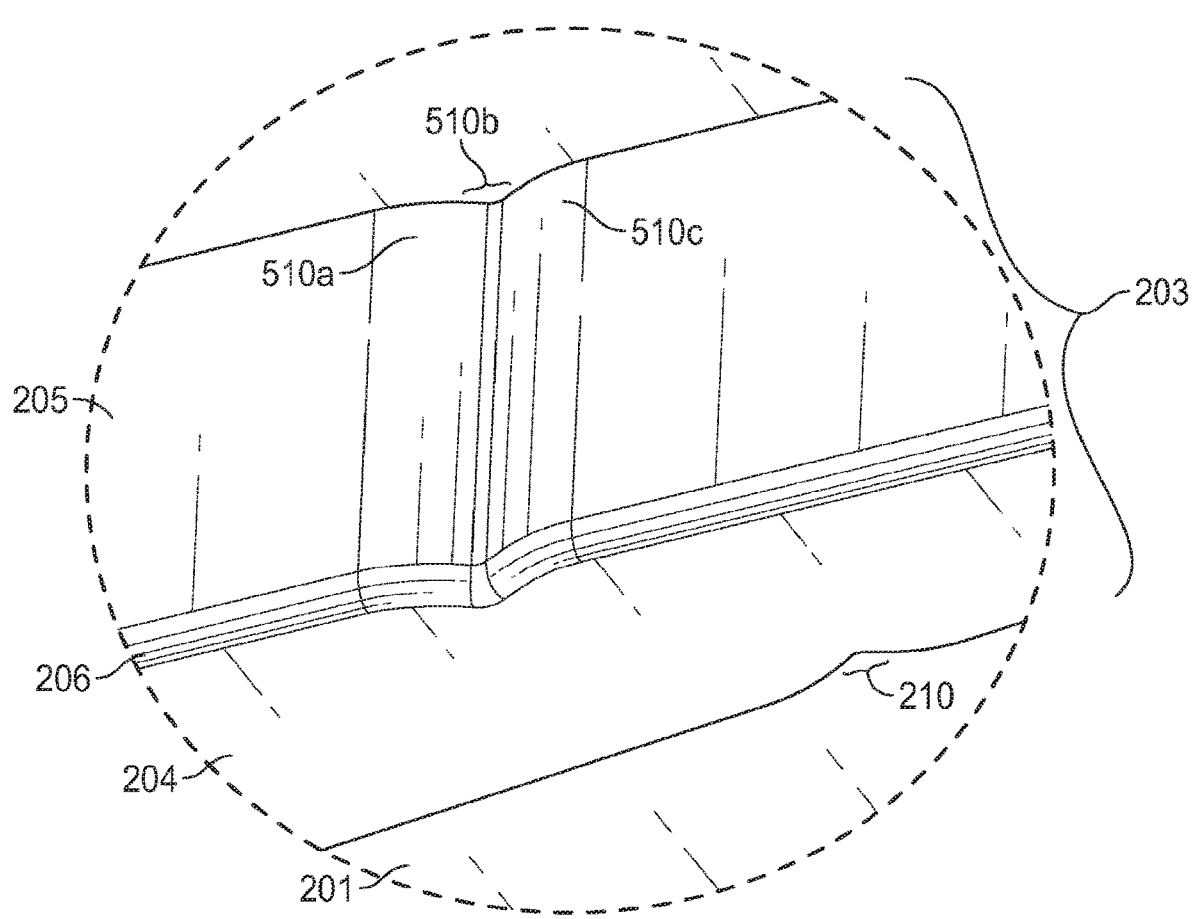
FIG. 5 illustrates the socket shown in FIG. 3 according to one example and as set off by the dashed circle in FIG. 3.

FIG. 5 illustrates a detail view of the socket 203 shown in FIG. 3 according to one embodiment as set off by the dashed circle in FIG. 3. Visible are: the surface of the first member, the floor faying surface, the wall faying surface, and the fillet. Further detail of indexing guides is shown in FIG. 5. The indexing guide includes a first surface 510a, a contact surface or edge 510b, and a second surface 510c. The contact surface may interconnect the first and second surfaces, and may extend from the first surface to the second surface. In the illustrated embodiment, the contact surface has a width that is greater than the line defining the intersection between the first and second surfaces. Alternatively, the contact surface may be the line defined by the intersection of the first and second surfaces (e.g., such that the contact surface has little or no width). The contact surface may be positioned or designed to come in contact with one or more of the faying surfaces of the second member. This embodiment may have a clearance of 0.002 in or less between the contact surface and the faying surface of the second member.

The width and/or shape of the contact surface of the first member can be altered to provide suitable guidance and positioning of the second member. For example, an upper portion of the contact surface may be tapered to allow an off-position part to self-guide back into place in the socket. For example, the contact surface may be angled such that the width of the socket in the location of the contact surface is wider at the top of the contact surface (e.g., the top of the volume defining the socket) and narrower at the bottom of the contact surface (e.g., the location where the contact surface intersects the floor in the socket).

Some or all of the indexing guide may include a third base material (such as wax, solder, salts, etc.), BFM, or flux. This third base material may be different from the first and/or second base materials of the first and second members. The formation of the indexed closed socket brazed joint assembly may include the steps of depositing and forming material in the socket that is shaped and used as an indexing guide. Upon heating and joint formation, this material may, melt, vaporize, solubilize (in liquid flux, for example), or otherwise be removed from the joint.

Figure 6:
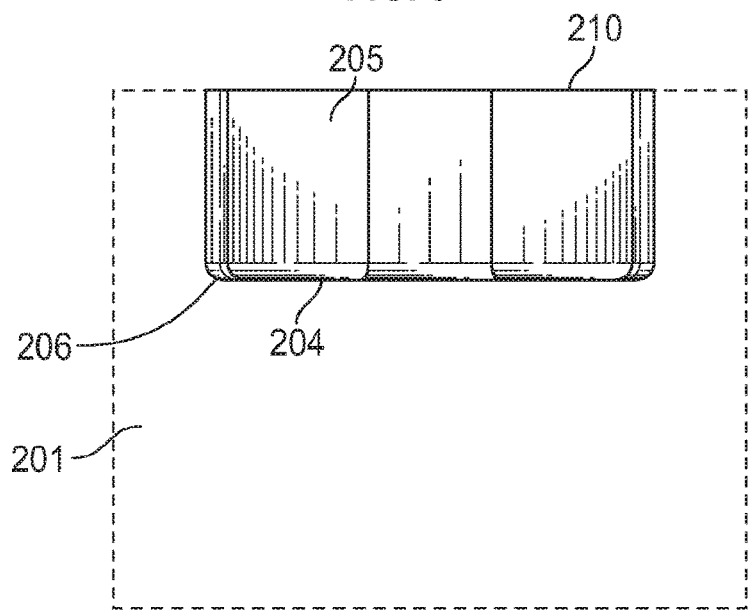
FIG. 6 is a cross-sectional view of the first member shown in FIG. 2 and across the section line as set off in FIG. 2.

FIG. 6 shows a cross-sectional view of the first member shown in FIG. 2A with the socket for formation of an indexed closed socket brazed joint assembly according to one embodiment across the section line as set off in FIG. 2. Visible are: a cross section of the first member, the floor faying surface, the wall faying surface, the fillet 206, and a profile of the indexing guides. In applications, the overall height of the side walls or wall faying surfaces in accordance with the desired mechanical requirements of the joint and the properties of the base materials comprising the members in the joint.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment a closed socket brazed joint may comprise: a first member, a second member with a first end having a first profile with at least first and second faying surfaces; and, a socket formed in said first member configured to receive the first end of the second member. The socket formed in the first member such that in a first state before the application of energy to the joint there is a gap with a width between the faying surfaces of the first member and the faying surfaces of the second member. Also in the first state, a slug of brazing fill material is disposed between the first end of the second member and at least one of the faying surfaces of the socket. A second state is created when energy is applied to the assembly, melting the brazing fill material which flows from between the first end of the second member and at least one of the faying surfaces of the socket filling the gap between the faying surfaces of the first and second member. In the first state, a slug of flux material may be disposed between at least one of: the first end of the second member and the slug of brazing fill material; or between the slug of brazing fill material and the at least one of the faying surfaces of the socket. The first fillet may also have a radius at least equal to the width of the gap between the faying surfaces of the first member and the faying surfaces of the second member in the first state.

An additional fillet may be formed in the wall faying surface of the socket at locations that correspond to a change in the profile of the second faying surface of the second member. The additional fillet may also have a radius at least equal to the width of the gap between the faying surfaces of the first member and the faying surfaces of the second member in the first state. The change in profile of the second faying surface of the second member may also be mirrored by the shape of the first faying surface of the second member. The profile change may consist of acute angle changes, curves, or any change that would otherwise vary the width of the gap between the wall faying surface of the socket and the second faying surface of the second member.

In an embodiment of a closed socket brazed joint end points defining the boundaries of the one additional fillet may be extended to form indexing guides configured to position the faying surfaces of the first member with the faying surfaces of the second member. The endpoints may be further modified into more complex shapes to support the indexing function.

In another embodiment, the first member comprises an annular ring and the second member comprises a conductor bar.

In another embodiment, the volume of the brazing fill material slug is equal to the volume of the socket less a volume of the portion of the first end of the second member in the socket multiplied by a factor of two. The volume of the brazing fill material slug may also be within the range of 1.8-2.2 units of volume. Practitioners in the art can recognize that a suitable mass of brazing fill material may be used once the volume is calculated.

In another embodiment, an indexing guide is configured to position the faying surfaces of the second member in a pre-determined alignment with the faying surfaces of the socket of the first member, forming an indexed closed socket brazed joint. The indexing guide may be comprised of at least one of: a first surface, a contact surface, or a second surface. The contact surface may be further configured to self-align the faying surfaces of the second member, thus preventing the mis-alignment of the faying surfaces of the first end of the second member with the faying surfaces of the socket formed in the first member. The indexing guide may also be composed from at least one of: brazing fill material, flux, and/or material that vaporizes upon joint formation. The indexing guide may be further configured to increase available faying surface area.

In another embodiment a brazed joint assembly may comprise at least one closed socket brazed joint with at least first and second members with respective faying surfaces; and at least one indexed closed socket brazed joint with at least first and second members and at least one index guide. The at least one index guide of the at least one indexed closed socket brazed joint is configured to align the faying surfaces of the at least first and second members of the at least one closed socket brazed joint. At least one member may be an annular ring and at least one member may be a conductor bar. The annular ring may also have at least three indexed closed socket brazed joints at 120° with respect to a center axis of the annular ring.

In another embodiment, a closed socket brazed joint may be formed following steps that comprise: providing a first member composed of a first base material; providing a second member composed of a second base material with a first end comprised of a first profile with at least first and second faying surfaces; forming in the first member a socket having plural faying surfaces with at least two portions separated by a fillet, the socket configured to receive the first end of the second member, wherein a radius of the fillet is at least equal to a distance between the faying surfaces of the first and second members when the first end of the second member is disposed in the socket; placing a slug of brazing fill material in the socket formed in the first member the slug of brazing fill material substantially in conformation with the first profile of the first end of the second member; placing the first end of the second member into the socket of the first member, trapping the slog of brazing fill material; applying energy to at least one of the first base material of the first member or the second base material of the second member; and, melting the brazing fill material. The volume of the brazing fill material may also be calculated as equal to a volume of the socket formed in the first member less a volume of the portion of the first end of the second member in the socket multiplied by a factor of two, wherein the slug of brazing fill material that is provided has a volume corresponding to the volume that is calculated. Also, the method may further comprise in the socket formed in the first member, forming an indexing guide configured to position the faying surfaces of the second member in a pre-determined alignment with the faying surfaces of the socket formed in the first member.

In another embodiment an apparatus comprises a first member having a first surface. The first member defines a closed socket formed into the first surface, the socket defined by plural faying surfaces, the plural faying surfaces including a peripheral sidewall and a floor. The peripheral sidewall extends from the first surface of the first member and terminates at the floor, the floor and the first surface being spatially independent surfaces. The peripheral sidewall is transitioned to the floor by a fillet. The socket is dimensioned to receive an end of a second member, the second member having plural faying surfaces for joining the second member to the first member. The peripheral sidewall may define plural indexing guides the indexing guides configured to position faying surfaces of the end of the second member in a pre-determined alignment with the faying surfaces of the socket for forming an indexed closed socket brazed joint. The fillet has a radius corresponding to a width of a distance between the sidewall and one or more of the faying surfaces of the end of the second member that are closest to the sidewall when the end of the second member is fully disposed in the socket. The fillet may also extend along partial portion of a junction between the floor and the peripheral wall. It may, for example, be interrupted by the presence of an indexing guide or a change in the geometry of the peripheral wall. In the above embodiment it is also possible that the sidewall includes a first pair of co-planar wall portions; and the sidewall includes a first indexing guide, the first indexing guide having a long axis oriented at the perpendicular or near-perpendicular angle and a transverse axis defining a depth of the first indexing guide, the first indexing guide protruding out from the first pair of co-planar wall portions towards a center of the socket, and the first indexing guide having a first surface, a contact surface, and a second surface, the first surface transitioning from one of the first pair of co-planar wall portions to the contact surface, and the second surface transitioning from the contact surface to the other of the first pair of co-planar walls, the contact surface aligned with the long axis of the first indexing guide. In addition, it may also be possible that the sidewall includes a second pair of co-planar wall portions; and the sidewall includes a second indexing guide, the second indexing guide having a long axis oriented at the perpendicular or near-perpendicular angle and a transverse axis defining a depth of the second indexing guide, the second indexing guide protruding out from the second pair of co-planar wall portions towards the center of the socket, and the second indexing guide having a first surface, a contact surface, and a second surface, the first surface of the second indexing guide transitioning from one of the second pair of co-planar wall portions to the contact surface of the second indexing guide, and the second surface of the second indexing guide transitioning from the contact surface of the second indexing guide to the other of the second pair of co-planar walls, the contact surface of the second indexing guide aligned with the long axis of the second indexing guide, wherein the first indexing guide is located on a first side of the socket and the second indexing guide is located on a second side of the socket opposite the first indexing guide.

In the embodiment of the apparatus above, it is further possible that the peripheral sidewall defines plural indexing guides protruding inwards toward a center of the socket, the indexing guides configured to position faying surfaces of the end of the second member in a pre-determined alignment with the faying surfaces of the socket, for forming an indexed closed socket brazed joint; the fillet has a radius corresponding a width of a distance between the sidewall and one or more of the faying surfaces of the end of the second member that are closest to the sidewall when the end of the second member is fully disposed in the socket; and the socket is elongate and has a length that is greater than a width of the socket and a depth of the socket, and the fillet extends along an entirety of a junction between the floor and the peripheral wall, and the peripheral wall at a first distal end of the socket is rounded to form a filleted end and the peripheral wall at a second distal end of the socket includes two adjacent, rounded lobe portions.

Another embodiment can include a motor comprising the apparatus described above, wherein the first member is a metallic, annular end ring; and the second member, wherein the end of the second member is disposed in the socket, the second member comprising a conductor bar; wherein the conductor bar is attached to the annular end ring by a brazed joint, the brazed joint comprising an interface between material of the annular end ring that defines the socket, the end of the second member, and brazing fill material disposed between the sidewall and conductor bar.

Finally, a method of manufacturing a part may comprise: providing the first member and the second member of the embodiment described immediately above; placing a slug of brazing fill material in the socket; placing the first end of the second member into the socket, trapping the slug of brazing fill material; applying energy to at least one of the first member or the second member; and melting the brazing fill material.

In an embodiment, a closed socket brazed joint (e.g., for a locomotive traction motor, other motor, or other metal joining application) includes a first member and a second member. The second member has a first end having a first profile with at least first and second faying surfaces. A socket is formed in the first member and configured to receive the first end of the second member. The socket has faying surfaces with at least two portions separated by a first fillet. The socket further is configured such that in a first state before the application of energy to the joint there is a gap with a width between the faying surfaces of the first member and the faying surfaces of the second member. In the first state a slug of brazing fill material is disposed between the first end of the second member and at least one of the faying surfaces of the socket. A second state is created when upon application of energy the brazing fill material melts and flows from between the first end of the second member and the at least one of the faying surfaces of the socket, filling the gap between the faying surfaces of the first and second members.

In another embodiment, in the first state a slug of flux material is disposed between at least one of: the first end of the second member and the slug of brazing fill material; or between the slug of brazing fill material and the at least one of the faying surfaces of the socket.

In another embodiment, a radius of the first fillet is at least equal to the width of the gap between the faying surfaces of the first member and the faying surfaces of the second member in the first state.

In another embodiment, at least one additional fillet is formed in the wall faying surface of the socket at locations that correspond to a change in the profile of the second faying surface of the second member. In another embodiment, the at least one additional fillet has a radius at least equal to the width of the gap between the faying surfaces of the first member and the faying surfaces of the second member in the first state. In another embodiment, end points of a curve defining a surface of the at least one additional fillet are extended to form indexing guides configured to position the faying surfaces of the first member with the faying surfaces of the second member. In another embodiment, e.g., where the joint is part of a locomotive traction motor or other motor, the first member includes an annular ring and the second member includes a conductor bar.

In another embodiment, a volume of the brazing fill material slug is equal to a volume of the socket less a volume of the portion of the first end of the second member in the socket multiplied by a factor of two. In another embodiment, the volume of the brazing fill material slug is within the range of 1.8-2.2 units of volume.

In another embodiment, the joint further includes an indexing guide configured to position the faying surfaces of the second member in a pre-determined alignment with the faying surfaces of the socket of the first member, forming an indexed closed socket brazing brazed joint. In another embodiment, the indexing guide includes at least one of: a first surface, a contact surface, or a second surface. In another embodiment, the indexing guide includes at least the contact surface, and the contact surface is configured to self-align the faying surfaces of the second member.

In another embodiment, the indexing guide is comprised of at least one of: brazing fill material, flux, and/or material that vaporizes upon joint formation (e.g., upon the application of energy to one or both members).

In another embodiment, the indexing guide is configured to increase available faying surface area.

In an embodiment, a motor includes an annular end ring and a conductor bar that are joined to one another at a closed socket brazed joint. The conductor bar has a first end having a first profile with at least first and second faying surfaces. A socket is formed in the end ring and configured to receive the first end of the conductor bar. The socket has faying surfaces with at least two portions separated by a first fillet. The socket further is configured such that in a first state before the application of energy to the joint there is a gap with a width between the faying surfaces of the end ring and the faying surfaces of the conductor bar. In the first state a slug of brazing fill material is disposed between the first end of the conductor bar and at least one of the faying surfaces of the socket. A second state is created when upon application of energy the brazing fill material melts and flows from between the first end of the conductor bar and the at least one of the faying surfaces of the socket, filling the gap between the faying surfaces of the ring and conductor bar. Additional such sockets may be formed in the ring, with additional conductor bars joined to the ring in the same manner. Second, distal ends of the conductor bars may be similarly joined to a second annular end ring, that is, two spaced apart end rings are connected by plural conductor bars extending therebetween, where the conductor bars are joined to the rings by closed socket brazed joints as described.

In another embodiment, a brazed joint assembly (e.g., for a locomotive traction motor, other motor, or other metal joining application) includes at least one closed socket brazed joint having at least first and second members with respective faying surfaces. It also includes at least one indexed closed socket brazed joint having at least the first member, a third member, and at least one index guide. The at least one index guide of the at least one indexed closed socket brazed joint is configured to align the faying surfaces of the at least first and second members of the at least one closed socket brazed joint.

In another embodiment, the first member is an annular ring, the second member is a first conductor bar, and the third member is a second conductor bar.

In another embodiment, the annular ring has at least three indexed closed socket brazed joints spaced apart from one another by 120° with respect to a center axis of the annular ring.

In another embodiment, an apparatus includes a first member, one or more second members, and one or more third members. The first member is respectively joined to the one or more second members by one or more closed socket brazed joints; respective ends of the one or more second members are disposed in respective one or more first sockets formed in the first member. The ends of the one or more second members and the one or more first sockets have respective faying surfaces. The first member is respectively joined to the one or more third members by one or more indexed closed socket brazed joints; respective ends of the one or more third members are disposed in respective one or more second sockets formed in the first member. Each of the one or more second sockets includes a respective at least one index guide (that is, each second socket includes one or more respective index guides). The index guide(s) are configured to align the faying surfaces of the first and one or more second members of the closed socket brazed joint(s). That is, in one aspect, some sockets have index guides and some do not, but the sockets with the index guides serve to index all the second and third members attached to the first member, when they are all joined in an assembly.

In another embodiment, a method (e.g., a method for forming a closed socket brazing brazed joint for a locomotive traction motor, other motor, or other joined-part assembly) includes providing a first member composed of a first base material; providing a second member composed of a second base material and having a first end included of a first profile with at least first and second faying surfaces; forming in the first member a socket having plural faying surfaces with at least two portions separated by a fillet, the socket configured to receive the first end of the second member, wherein a radius of the fillet is at least equal to a distance between the faying surfaces of the first and second members when the first end of the second member is disposed in the socket; placing a slug of brazing fill material in the socket formed in the first member, the slug of brazing fill material substantially in conformation with the first profile of the first end of the second member; placing the first end of the second member into the socket of the first member, trapping the slug of brazing fill material; applying energy to at least one of the first base material of the first member or the second base material of the second member; and melting the brazing fill material.

In another embodiment, the method further includes calculating a volume for the brazing fill material as equal to a volume of the socket formed in the first member less a volume of the portion of the first end of the second member in the socket multiplied by a factor of two. The slug of brazing fill material that is provided has a volume corresponding to the volume that is calculated.

In another embodiment, the method further includes, in the socket formed in the first member, forming an indexing guide configured to position the faying surfaces of the second member in a pre-determined alignment with the faying surfaces of the socket formed in the first member.

In another embodiment, an apparatus (e.g., for a locomotive traction motor, other motor, or other joined-part assembly) includes a first member having a top first surface. The first member defines a closed socket formed into the top first surface. The socket is defined by plural faying surfaces, with the plural faying surfaces including a peripheral sidewall and a floor. The peripheral sidewall extends from the first surface and terminates at the floor. The floor and first surface are spatially independent surfaces (e.g., they do not intersect with one another, for example they may be parallel to one another). The peripheral sidewall is transitioned to the floor by a fillet. The socket is dimensioned to receive an end of a second member, the second member having plural faying surfaces, for joining the second member to the first member.

In another embodiment, the peripheral sidewall defines plural indexing guides. The indexing guides are configured to position faying surfaces of the end of the second member in a pre-determined alignment with the faying surfaces of the socket, for forming an indexed closed socket brazed joint.

In another embodiment, the fillet has a radius corresponding to a width of a distance between the sidewall and one or more of the faying surfaces of the end of the second member that are closest to the sidewall when the end of the second member is fully disposed in the socket.

In another embodiment, the fillet extends along partial portions of a junction between the floor and the peripheral wall.

In another embodiment, the sidewall includes a first pair of co-planar wall portions, and the sidewall includes a first indexing guide. The first indexing guide has a long axis oriented at a perpendicular or near-perpendicular angle relative to the first surface and a transverse axis defining a depth of the first indexing guide. The first indexing guide protrudes out from the first pair of co-planar wall portions towards a center of the socket. The first indexing guide has a first surface, a contact surface, and a second surface. The first surface transitions from one of the first pair of co-planar wall portions to the contact surface, and the second surface transitions from the contact surface to the other of the first pair of co-planar walls. The contact surface is aligned with the long axis of the first indexing guide.

In another embodiment, the sidewall includes a second pair of co-planar wall portions. The sidewall includes a second indexing guide. The second indexing guide has a long axis oriented at a perpendicular or near-perpendicular angle (relative to the first surface) and a transverse axis defining a depth of the second indexing guide. The second indexing guide protrudes out from the second pair of co-planar wall portions towards the center of the socket. The second indexing guide has a first surface, a contact surface, and a second surface. The first surface of the second indexing guide transitions from one of the second pair of co-planar wall portions to the contact surface of the second indexing guide, and the second surface of the second indexing guide transitions from the contact surface of the second indexing guide to the other of the second pair of co-planar walls. The contact surface of the second indexing guide is aligned with the long axis of the second indexing guide. The first indexing guide is located on a first side of the socket and the second indexing guide is located on a second side of the socket opposite the first indexing guide.

In another embodiment, the peripheral sidewall defines plural indexing guides protruding inwards toward a center of the socket. The indexing guides are configured to position the faying surfaces of the end of the second member in a pre-determined alignment with the faying surfaces of the socket, for forming an indexed closed socket brazed joint. The fillet has a radius corresponding to a width of a distance between the sidewall and one or more of the faying surfaces of the end of the second member that are closest to the sidewall when the end of the second member is fully disposed in the socket. The socket is elongate and has a length that is greater than a width of the socket and a depth of the socket, and the fillet extends along an entirety of a junction between the floor and the peripheral wall, and the peripheral wall at a first distal end of the socket is rounded to form a filleted end and the peripheral wall at a second distal end of the socket includes two adjacent, rounded lobe portions.

In another embodiment, a motor includes a metallic, annular end ring having a top first surface. The end ring defines a closed socket formed into the top first surface. The socket is defined by plural faying surfaces, with the plural faying surfaces including a peripheral sidewall and a floor. The peripheral sidewall extends from the first surface and terminates at the floor. The floor and first surface are spatially independent surfaces (e.g., they do not intersect or directly connect with one another, for example they may be parallel to one another). The peripheral sidewall is transitioned to the floor by a fillet. The socket is dimensioned to receive an end of a conductor bar, the conductor bar having plural faying surfaces, for joining the conductor bar to the end ring.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following clauses, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other.

In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended claims, along with the full scope of equivalents to which such clauses are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

A reference herein to a patent document or any other matter identified as prior art, is not to be taken as an admission that the document or other matter was known or that the information it contains was part of the common general knowledge as at the priority date of any of the claims.

What is claimed is:

1. An assembly, comprising:
   a first member having a socket with a floor and opposing walls, the floor separated from the opposing walls by curved fillets; and
   a second member with an end having opposite faying surfaces separated from each other by an interconnecting faying surface, the socket of the first member shaped to receive the end of the second member with the interconnecting faying surface of the second member facing the floor of the first member in the socket and the opposite faying surfaces of the second member facing the opposing walls of the first member;
   wherein the socket is shaped such that, before direction of thermal energy into the socket, there are one or more gaps between the opposing walls of the first member and the opposite faying surfaces of the second member with a slug of brazing fill material between the end of the second member and the floor of the socket in the first member; and
   wherein the socket is shaped such that, responsive to directing the thermal energy into the socket, the brazing fill material melts, flows, and fills the one or more gaps between the opposite faying surfaces of the second member and the opposing walls of the socket in the first member to form a closed socket brazed joint that joins the first and second members.

2. The assembly of claim 1, wherein the socket is shaped such that the slug of the brazing fill material also is disposed between at least one of the opposite faying surfaces of the second member and one or more of the opposing walls of the socket in the first member.

3. The assembly of claim 1, wherein a radius of the curved fillets is at least as long as the one or more gaps between (a) the opposing walls of the first member and (b) the opposite faying surfaces of the second member.

4. The assembly of claim 1, wherein the socket is shaped such that, before direction of the thermal energy into the socket, the slug of the brazing fill material is only between the end of the second member and the floor of the socket in the first member.

5. The assembly of claim 1, wherein one or more of the socket in the first member or the second member has a tapered shape.

6. The assembly of claim 1, wherein the first member includes one or more indexing guides protruding into the socket from one or more of the opposing walls of the first member.

7. The assembly of claim 6, wherein the one or more indexing guides include a first surface, a second surface, and an interconnecting surface, the first surface and the second surface protruding into the socket, the interconnecting surface connecting the first surface with the second surface inside the socket.

8. The assembly of claim 1, wherein the socket in the first member includes a rounded end between end points of an arc formed by the rounded end, the end points of the arc providing indexing guides positioned to engage and center the second member within the socket in the first member.

9. The assembly of claim 1, wherein the assembly is a motor.

10. A method, comprising:
    placing a slug of a brazing fill material in a socket of a first member having a floor and opposing walls in the socket with the floor separated from the opposing walls by curved fillets;
    placing a second member in the socket of the first member with an end of the second member having opposite faying surfaces separated from each other by an interconnecting faying surface facing the floor of the first member in the socket and the opposite faying surfaces of the second member facing the opposing walls of the first member, the second member placed into the socket of the first member such that there are one or more gaps between the opposing walls of the first member and the opposite faying surfaces of the second member with the slug of brazing fill material between the end of the second member and the floor of the socket in the first member; and
    directing thermal energy into the socket to melt the slug of the brazing fill material such that the brazing fill material fills the one or more gaps between the opposite faying surfaces of the second member and the opposing walls of the socket in the first member to form a closed socket brazed joint that joins the first and second members.

11. The method of claim 10, wherein the slug of the the brazing fill material is placed into the socket such that the slug of the brazing fill material also is disposed between at least one of the opposite walls of the second member and one or more of the opposing walls of the socket in the first member.

12. The method of claim 10, further comprising forming the curved fillets with a radius of the curved fillets that is at least as long as a width of the one or more gaps between (a) the opposing walls of the first member and (b) the opposite faying surfaces of the second member.

13. The method of claim 10, wherein, prior to directing the thermal energy into the socket, the slug of brazing fill material is only between the end of the second member and the floor of the socket in the first member.

14. The method of claim 10, further comprising including the closed socket brazed joint between the first and second members in a motor.

15. A motor, comprising:
- a first member having a tapered socket with a floor and opposing walls, the floor separated from the opposing walls by a curved surface having a radius of curvature; and
- a second member with an end having opposite surfaces separated from each other by an interconnecting surface, the socket of the first member shaped to receive the second member with the interconnecting surface of the second member facing the floor of the first member in the socket and the opposite surfaces of the second member facing the opposing walls in the socket of the first member;
- wherein, prior to direction of thermal energy into the socket, there are one or more gaps between (a) the opposing walls in the socket of the first member and (b) the opposite surfaces of the second member with a slug of brazing fill material between the end of the second member and the floor of the socket in the first member; and
- wherein, responsive to directing the thermal energy into the socket, the brazing fill material melts, flows, and fills at least one of the gaps between the opposite surfaces of the second member and the opposing walls in the socket in the first member to form a closed socket brazed joint that joins the first and second members.

16. The motor of claim 15, wherein the socket is shaped such that the slug of the brazing fill material also is disposed between at least one of the opposite walls of the second member and at least one of the opposing walls of the socket in the first member.

17. The motor of claim 15, wherein the radius of curvature of the curved surface is at least as long as the one or more gaps between (a) the opposing walls of the first member and (b) the opposite faying surfaces of the second member.

18. The motor of claim 15, wherein the socket is shaped such that, before direction of the thermal energy into the socket, the slug of the brazing fill material is only between the end of the second member and the floor of the socket in the first member.

19. The motor of claim 15, wherein the second member has a tapered shape.

20. The motor of claim 15, wherein the first member includes one or more indexing guides protruding into the socket from one or more of the opposing walls of the first member, the one or more indexing guides including a first surface, a second surface, and an interconnecting surface, the first surface and the second surface protruding into the socket, the interconnecting surface connecting the first surface with the second surface inside the socket.

* * * * *